Nov. 2, 1937.                M. S. HOPKINS                2,097,881
                              ROTARY ENGINE
                          Filed Nov. 26, 1935           2 Sheets-Sheet 1

INVENTOR.
Milton S. Hopkins
BY
ATTORNEYS.

INVENTOR.
Milton S. Hopkins
BY
ATTORNEYS.

Patented Nov. 2, 1937

2,097,881

UNITED STATES PATENT OFFICE 2,097,881

ROTARY ENGINE

Milton S. Hopkins, Glendale, Calif.,

Application November 26, 1935, Serial No. 51,644

9 Claims. (Cl. 103—126)

This invention relates to rotary engines, and more particularly to rotary engines of the type which employ a plurality of non-circular rotors cooperating with each other to define a working chamber whose volume is caused to vary as the rotors turn, due to their non-circular characteristics. The present invention, therefore, represents an improvement in the subject matter of United States Letters Patent Number 1,349,882, issued August 17, 1920, to Walter A. Homan.

One of the objects of the present invention is to provide an improved type of rotor for rotary engines of this general class, so shaped and proportioned that actual physical contact is maintained between the several cooperating rotors throughout their entire cycle of rotation, and thereby establish a sufficiently tight seal between the elements which define the working chamber, to maintain compression or other working pressure within the chamber as the engine operates.

Another object is to improve the basic design of engines of the general character indicated, and to dispose the cooperative parts thereof, in such an improved relationship that a plurality of working chambers are defined, and the respective volumes thereof caused to vary, by each set of rotors.

A more detailed object in this connection is to provide a rotary engine characterized by a plurality of non-circular rotors mounted for rotation while in sustained contact with each other to define an inner working chamber, and to enclose the rotors in a suitably shaped housing whereby an outer working chamber is presented. Due to the non-circular characteristics of the several cooperating rotors of an engine so arranged, the respective volumes of the inner and outer chambers vary in alternation with each other, whereby the efficiency of the engine is materially increased, and the general field of its utility is materially widened, as will be explained more fully hereinbelow.

A further object is to simplify the design of the engines of the character indicated, in such a manner as to dispense with all reciprocating valves and all valve seats, rocker-arms, push-rods, guides, and springs therefor.

A more detailed object in this connection is to provide means on, and preferably a part of the rotors themselves, whereby flow of the working fluid of the engine is controlled in accordance with the requirements of the cycle of the engine's operation.

In general, the present invention contemplates the provision of a rotary engine of the general character indicated which is of highly simplified design. In my new engine, the number of working parts is greatly reduced, there being only five moving parts, four of which are of identical construction. This not only reduces the cost of construction and maintenance of the engine to an absolute minimum, but it also reduces the weight and over-all size of the engine per unit of power. The peculiar cooperation between the inner and outer working chambers particularly adapts my engine for use as a fluid pump of the "continuous flow" type, because the respective volumes of the chambers increase and decrease alternately with each other; i. e., while the inner chamber is contracting and thereby forcing a quantity of fluid therefrom into the delivery or exhaust line, the outer chamber is expanding, and is being charged with a fresh supply of the fluid, discharge of which will commence immediately upon completion of discharge from the inner chamber, and vice versa. This same principle of alternate volumetric variations of the two chambers adapts the engine for use as a double acting expansion engine, of either the internal or external combustion type.

My present invention has other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the prefered form within the scope of my invention as set forth in the claims.

Referring to the drawings,

Figure 1 is a view in side elevation of an engine constructed in accordance with the principles of the present invention, and embodied as a prime-mover of the internal combustion type. The rotors, intake and exhaust ports, rotor passages and wall channels are indicated in broken lines, the rotors and passages being in the respective positions assumed thereby when compression occurs in the inner chamber and the intake stroke in the outer. The direction of view is indicated by the arrow $I$ of Fig. 3.

Figure 1:
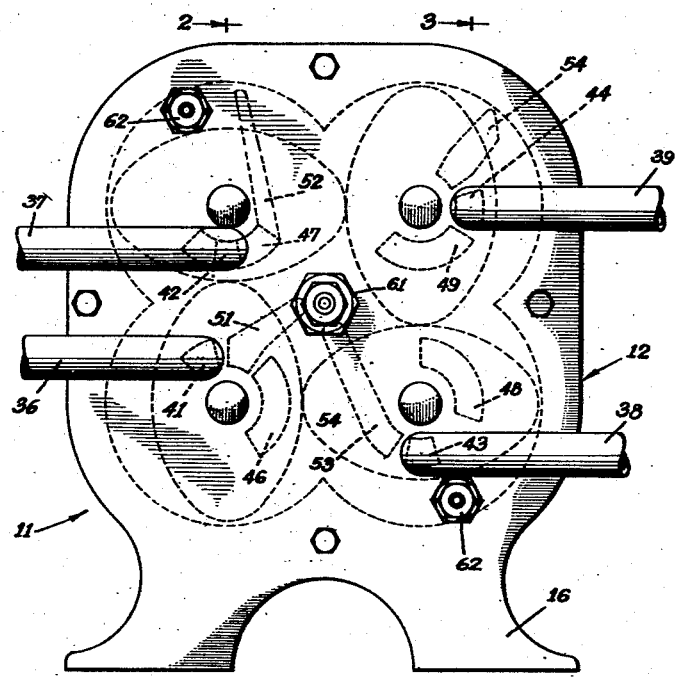

That embodiment of my invention chosen for illustration and detailed description, is an internal combustion engine. It comprises a housing 11, which includes separable front and rear side plates 12 and 13, respectively, and top, bottom, and end walls which can conveniently be provided by means of a peripheral flange 14 which is preferably integral with one of the side walls, say the rear side wall 13. Preferably, supporting legs 16 are also formed integrally with the same wall 13 as that which includes the peripheral wall 14 as a portion thereof.

The flange 14 and plates 12 and 13 cooperate to define a closed chamber 17, which is divided into two parts 18 and 19 through the expedient of a plurality, preferably four, rotors 21 revolubly mounted within the chamber 17 upon shafts 22 which are journaled in the opposed plates 12 and 13, bosses 23 being provided therein for that purpose. These shafts 22 are disposed with their axes parallel to each other and spaced equidistantly about the periphery of a circle the center of which is in the central, longitudinal axis of the housing 11. Each of the rotors 21 is in frictional contact with each of the two adjacent rotors 21, in a line of contact extending from the front plate 12 to the rear plate 13, with the result that the inner and outer chambers 18 and 19, respectively, are at all times separated from each other. These lines of physical contact are maintained throughout the entire cycle of rotation of the rotors, each being so shaped and proportioned that although each is of non-circular configuration and they all rotate continuously and in a common direction, all deviations from constant radius in one rotor are compensated for by opposite deviations in the length of the radii of the two adjacent rotors. Whereas the Homan patent identified hereinabove discloses non-circular rotors roughly cooperating with each other in the same general manner, they were not designed to contact each other, in fact the specification of the said patent stipulates that they must not be permitted thus to contact, as they only approximated the configuration which would enable them actually to touch each other and yet not bind so as to prevent further rotation.

Figure 6:
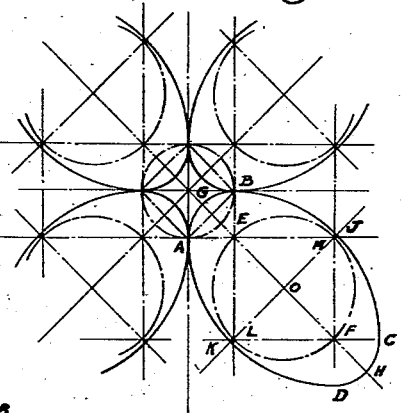
Figure 6 is a diagrammatic view to be used hereinbelow in explaining the mathematical development of the ideal configuration of the rotors.

One of the important features of the present invention, therefore, lies in the configuration and proportions of each of the rotors, it being understood that all of the several rotors are preferably of identical shape and size. This ideal shape of rotor can best be understood by reference to Figure 6 wherein it is shown that the periphery of each rotor is completely defined by four circular arcs, to-wit: Two minor arcs AGB and CHD at the ends of the rotor, and two major arcs BJC and DKA at the sides of the rotor. The two arcs of both of these pairs have identical radii, and each of the four arcs is of 90°. The centers of all the arcs are equally spaced from the axis O about which the rotor turns, and the minor arcs AGB and CHD have their respective centers at E and F in the major axis GH of the rotor, while the major arcs BJC and DKA have their respective centers at L and M, which two points in the modification illustrated, lie in the minor axis JK of the rotor beyond the center from the respective arcs which are inscribed thereabout. It should be pointed out, however, that the relative length of the radii of the major and minor axes is not necessarily constant; i. e., long and slender rotors can be used, or short and relatively wide rotors, as determined by the desired compression ratio which an engine being designed in accordance with the principles of the present invention, should have. The only requirements in this connection which must be adhered to in designing the rotor are that the respective centers of the arcs must lie in the axes (or, in the case of a relatively long, thin rotor, as compared with the ones illustrated, the centers of the major, or side arcs will lie in extensions of the minor axis outside the limits of the rotor itself), that all the arcs are of 90°, and that their centers are equally spaced from the axis of rotation of the rotor. Adherence to these requirements in designing the rotor will result in positioning the respective centers E, F, L, and M of the arcs AGB, CHD, BJC, and DKA in a circle EMFL, the center of which lies in the axis of rotation of the rotor.

Figure 2:
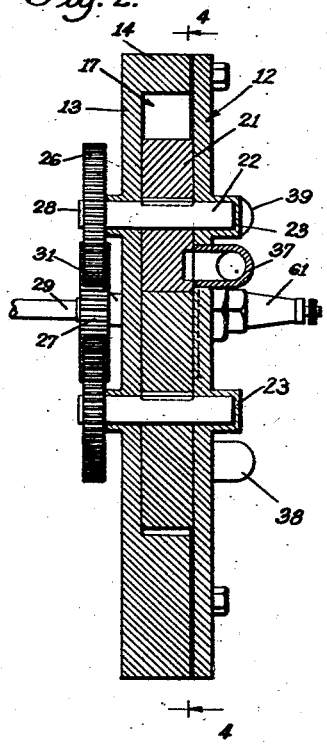
Figure 2 is a transverse vertical sectional view, the plane of section being indicated by the line 2—2 of Fig. 1, and the direction of view by the arrows.
Figure 4:
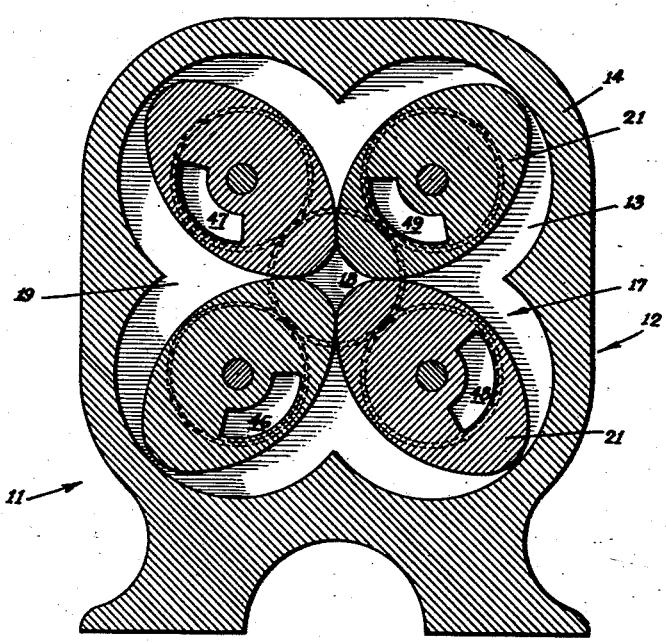
Figure 4 is a longitudinal vertical sectional view which may be considered as having been taken upon the lines 4—4 of Fig. 2 with the direction of view as indicated, but with the rotors turned to the positions assumed thereby at the time of combustion within the inner chamber.
Figure 5:
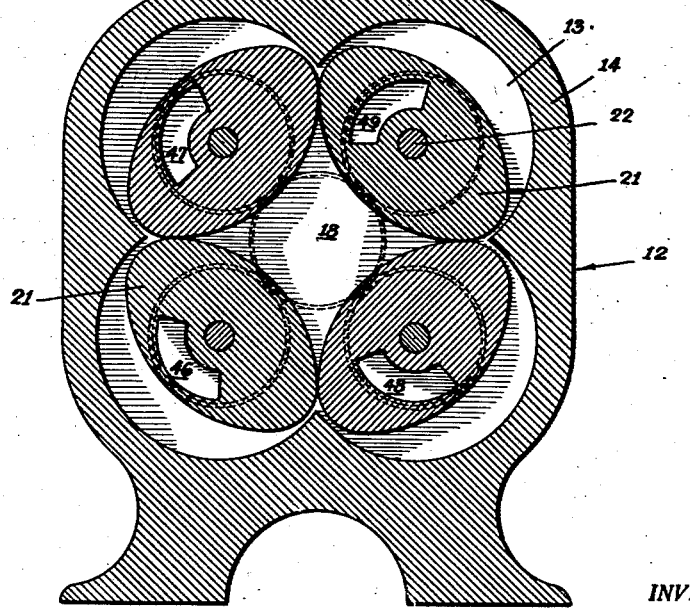
Figure 5 is a view similar to Fig. 4, but showing the rotors as at the end of the power stroke in the inner chamber and at the beginning of the power stroke in the outer chamber.

When each of the four rotors 21 is designed according to these principles, it will be found that actual physical, sliding contact will be maintained between each rotor and the two rotors adjacent thereto, throughout the entire cycle of rotation of the rotors, provided they are all rotated in the same direction and at the same rate, and provided further that they all occupy the same positions with respect to the circle within the periphery of which the axes of the four shafts 22 are disposed, that is to say the four rotors 21 are all disposed, at one period during their cycle of rotation, with their major axes disposed radially of that circle, as shown in Figure 4, and at another period during the cycle they are all positioned with their major axes disposed tangentially of that circle, as shown in Figure 5, and at an intermediate period the rotors are all disposed with their major axes at the same angle with respect to radii of the circle, as indicated upon Figure 1. This relative positioning of the rotors and their rotation at the common speed are maintained through the expedient of gears 26 and 27, best shown upon Figure 2. One of the gears 26 is associated with each of the rotors 21 being affixed securely upon an end 28 of the shaft 22 of that rotor, which end 28 extends through the rear plate 13. The gears 26 do not enmesh with each other, but they do mesh with the center gear 27 which is journaled upon a suitable shaft 29, one end of which is journaled in a suitable boss 31 provided upon the plate 13. The other end of the shaft 29 can be extended in any desired manner to permit power developed by the motor to be taken off by any suitable mechanism (not shown).

Owing to the non-circular characteristic of the rotors 21, the effect of their rotation is to vary the volumetric capacity of the inner and outer chambers 18 and 19, respectively, in alternation with each other; i. e., when the rotors 21 are disposed with their major axes extending radially from the center of the housing, as in Figure 4, the volumetric capacity of the inner chamber 18 will be reduced to its minimum, whereas that of the outer chamber 19 is at its greatest; and when the rotors 21 are disposed with their major axes in perpendicularity with radii of the housing, as in Figure 5, the situation will be reversed; i. e., the volumetric capacity of the inner chamber 18 is increased to its maximum, whereas that of the outer chamber 19 is decreased to its minimum. It is because of this regular variation in capacity of the two chambers that they are enabled to function as the working chambers of an engine to perform any kind of work which can be performed by a piston reciprocating within a cylinder. For example, when the invention is embodied as an internal combustion engine, as in the modification here being described, energy in the form of heat is translated into the form of mechanical energy delivered as useful work by the rotating shaft 29. It is readily apparent, however, that by only slight modification of the structure herein discussed, the device can be used as a fluid pump, or as a variable brake wherein braking action is attained by restricting the flow of fluid induced by mechanical rotation of the rotors.

Because of the fluctuation in volumetric capacity of the two chambers 18 and 19, it is only necessary to provide suitable means for introducing working fluid to the chambers and exhausting it therefrom, and for regulating the flow of such fluid in accordance with the periods in the cycle of an expansion motor to cause the engine to operate effectively as a prime mover. In the manner of provision of these means for conducting and regulating the flow of working fluid, resides another of the important features of the present invention, inasmuch as the particular type of flow regulating means which I have developed, obviate the necessity of employing any valves, valve seats, push rods, rocker arms, cams, and tappets. Because of the elimination of these elements which are generally required, I have made it possible to provide an efficiently operating engine consisting of only five moving parts, all but one of which are of identical construction.

My improved flow-regulating means whereby these advantages are derived, comprises a suitable number of grooves formed in faces of the rotors and adapted to establish communication, at the proper period and for the proper time interval during the engine's cycle, between the working chambers and suitable conduits or manifolds for conducting explosive gases to and from the chambers. In the present modification, the groove used for conducting fluid to a chamber is in one rotor, and that used for exhausting the chamber is in another rotor. It should be understood, however, that both grooves could be formed in the same rotor, either in opposite faces thereof or in different locations upon the same face of a rotor. The illustrated modification is believed preferable, however, since by disposing one of the grooves in each of the rotors it is made possible to employ rotors all of which are of identical construction, an item which contributes toward economy of manufacture.

Figure 3:
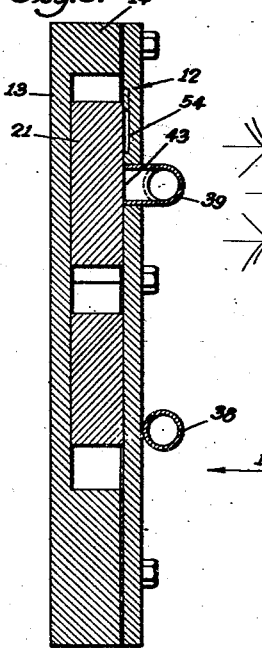
Figure 3 is a view similar to Fig. 2, the plane of section being taken upon the line 3—3 of Fig. 1 and the direction of view indicated by the arrows.

Intake manifolds 36 and 37 are provided for the inner and outer chambers 18 and 19, respectively, as are also exhaust manifolds 38 and 39, respectively. These manifolds terminate at ports 41, 42, 43, and 44, respectively, in the inner face of the front plate 12, in such position that each is at all times covered by one of the rotors 21. The function of each of the rotor grooves is determined by the type of manifold, the terminal port of which is associated with that groove. Hence, the groove 46 in the lower left hand rotor, as viewed upon Figures 1, 3, and 5, functions as an inlet passage for the inner chamber 18, and the groove 47 in the upper left hand rotor serves the same purpose for the outer chamber 19. Similarly, the groove 48 in the lower right hand rotor, and the groove 49 in the upper right hand rotor, as viewed upon the same figures, function as exhaust passages for the inner and outer chambers 18 and 19, respectively. Intake channels 51 and 52 are formed in the inner face of the plate 12, each in position to communicate at one end with the associated intake rotor grooves 46 and 47, respectively, and at the other end with the inner chamber 18 and outer chamber 19, respectively. Similarly, exhaust channels 53 and 54 are also formed in the inner face of the plate 12, each in position to communicate at one end with the associated exhaust rotor grooves 48 and 49 respectively, and at the other end with the inner chamber 18 and the outer chamber 19, respectively. Each of the rotor grooves 46, 47, 48, and 49 is of arcuate form, and adapted to come into registry with the associated port 41, 42, 43, or 44, as the case might be, as the associated rotor turns, and also with an end of the associated channel 51, 52, 53, or 54, and thereby establish communication between the associated manifold 36, 37, 38, or 39, as the case might be, and the associated chamber 18, or 19.

Considering first the cycle of operation of the inner chamber 18, Figure 4 illustrates the rotors in the respective positions assumed thereby substantially at the time of ignition, i. e. at the beginning of the power stroke. The expansion of gases within the chamber 18 suddenly increases the pressure within the chamber 18, as in any internal combustion engine, causing the rotors to turn, since in this way the volumetric capacity of the chamber 18 is caused to increase. The direction of the rotation of the rotors 21 in the modification illustrated is in a clockwise direction as viewed upon the figures. During the time that the rotors are turning through 90° of rotation, this being the period of expansion within the chamber 18 and analagous to the power stroke within a reciprocating engine, the exhaust groove 48 will first come into registry with the exhaust port 43; but not until substantially the full 90° of rotation have been completed will the groove 48 come into registry with the exhaust channel 53. When this occurs the parts will be disposed substantially as illustrated on Figure 5. The inner end of the channel 53 is then uncovered by the associated rotor and its outer end is in communication with one end of the rotor groove 48. The other end of the groove 48 communicates with the port 43, thus permitting escape of the exhaust gases through the exhaust manifold 38. Communication between these parts will prevail throughout substantially the next quarter turn of the rotors, this period in the cycle of the engine's operation constituting its exhaust stroke. During this period, the intake rotor groove 46 comes first into registry with the intake port 41, and then, as the period terminates, with the intake channel 51, also, thus establishing communication between the intake manifold 36 and the chamber 18. This communication prevails throughout the next quarter turn, i. e. the third quarter turn since occurrence of ignition. This third quarter turn constitutes the intake stroke, and since the diametric capacity of the chamber 18 is at this time increasing, explosive gases will be drawn into the chamber as long as the described communication through the intake port 41, rotor groove 46, and channel 51, obtains. During the ensuing 90° of rotation, or the compression stroke, all communication between the chamber 18 and the atmosphere is cut off, with the result that as the volumetric capacity of the chamber decreases, the pressure of the gases entrapped therein is increased, the amount of such increase in pressure being determined by the compression ratio for which the engine has been designed. Just prior to completion of the power stroke, the compressed explosive mixture is ignited, as by a suitable spark plug 61 which is arranged to produce the necessary spark for this purpose at suitably timed intervals, any appropriate source of electrical energy and ignition timing mechanism (not shown) being employed. Such ignition of the explosive working fluid within the chamber 18 again raises the pressure therein, imposing another rotative impulse upon the rotors, causing the cycle of operation just described to be repeated.

A similar cycle of operation occurs within the outer chamber. The minimum volumetric capacity thereof is established when the rotors 21 are disposed with their major axes at right angles with radii of the housing. Hence, ignition within the outer chamber, which may be effected by means of preferably a plurality of spaced and simultaneously actuated spark plugs 62, occurs when the rotors 21 are displaced one quarter turn from their position at the time of ignition within the inner chamber, in the present instance, 90° of rotation subsequently to the time of ignition within the inner chamber 18. At the time of ignition with the inner chamber, the volumetric capacity thereof is at its minimum, as stated hereinabove, and that of the outer chamber 19 is at its maximum. Furthermore, at this time during the engine's cycle all communication between the outer chamber 19 and the atmosphere is cut off. Hence, during the ensuing 90° of rotation, gases which have, during the preceding quarter turn, been drawn into the outer chamber 19 (as will be explained hereinbelow) are compressed. When the rotors 21 reach the positions indicated upon Figure 5; i. e., with their major axes disposed perpendicularly to radii of the housing, the volumetric capacity of the outer chamber 19 will have been reduced to its minimum. Hence, ignition, through the expedient of the plurality of spark plugs 62 and appropriate electrical energizing and ignition timing apparatus (not shown) occurs at this time. The resultant expansion of the ignited gases imposes additional rotative impulse upon all the rotors 21, since in turning from their positions as indicated upon Figure 5, to positions wherein their major axes extend radially of the housing, the volumetric capacity of the outer chamber 19 increases. As the rotors 21 reach this last named position; i. e., with their major axes disposed radially of the housing, the exhaust rotor groove 49 establishes communication between the exhaust port 44 and the exhaust channel 54, with the result that during the ensuing 90° of rotation, during which the volumetric capacity of the chamber 19 decreases, the products of combustion of the gases will be exhausted through the manifold 39.

Upon completion of this period of the cycle; i. e., when the rotors 21 have turned through 270° after ignition, communication between the exhaust channel 54 and the exhaust port 44 will be broken, whereas communication will be established at that time between the intake port 42 and the intake channel 52 through the intake rotor groove 47. This permits the appropriate combustible gases to be drawn into the chamber 19 during the ensuing quarter turn of the rotors 21, in preparation for their subsequent compression, as described hereinabove. This cycle is repeated as the engine continues to operate.

Whereas from the above description of the construction and operation of my improved engine, it becomes apparent that for each rotation of the rotors 21 there are two power strokes, this being double the number that can be secured in engine of this type provided with but a single working chamber, it is also apparent that the time intervals between these two power impulses are not equal. That is to say, ignition occurs within the outer chamber 19 when the rotors 21 have turned only 90° after ignition has occurred within the inner chamber 18, and then the rotors 21 must turn through 180° before the next successive power impulse occurs. In the event that this irregular application of power to the rotors 21 should prove disadvantageous, it is obvious that such disadvantage can be minimized by the use of a suitable flywheel. Under most circumstances, however, this feature of my engine is not disadvantageous, inasmuch as the mechanism hereinabove described, in reality is intended for use as but one unit of a multiple engine containing a plurality of the housings 11, each having the plurality of rotors 21, and preferably with the corresponding rotors 21, in all the housing carried by the same shafts, after the manner disclosed in the said Homan patent, identified hereinabove. However, inasmuch as the method of coupling a plurality of units together forms no portion of the present invention, it has not been deemed expedient to illustrate and describe more than a single unit herein.

There being no reciprocating members in the engine of the present invention, a much smoother and quieter operating engine is provided than any which employs reciprocating members, such as pistons. However, inasmuch as the principle of operation of the present engine is based upon expansion of gases within closed chambers, all the efficiency of an engine operated upon the "positive pressure" principle is attained, without, however, incurring any of the disadvantages inherent in the reciprocating engine, such as excessive friction and vibration. In fact, the engine of the present invention practically eliminates vibration, inasmuch as all the movable elements of the engine are moved only in rotary action.

It becomes readily apparent, from the above description of the present invention, that its range of applicability is practically limitless. It can be employed as a prime mover to serve the same manifold functions of any type of motor. It can be employed as a pump, for the purpose of moving fluids; and it might also be mentioned that the efficiency of the two alternately operating working chambers is even more advantageous here than when the principle of the present invention is embodied in the form of an expansion motor. It can be employed to great advantage as a power transmitting device to translate energy in the form of a moving fluid into a rotation of mechanical parts and vice versa; and closely allied to this use, it can be employed as a variable speed clutch, or as a vehicle brake.

I claim:

1. In an engine of the character described, a housing, a plurality of non-circular rotors mounted therein for simultaneous rotation all in the same direction about parallel axes, and contacting each other throughout their entire cycle of rotation whereby they and opposed walls of said housing cooperate to define a chamber whose volume varies as said rotors turn, the periphery of each of said rotors being defined by an arc at each end thereof having its center on the major axis of the rotor, and an arc defining each side of the rotor and connecting said end arcs, each side arc having its center on the line of the minor axis of the rotor beyond the axis of rotation thereof from said side arc, and means for conducting fluid to and from said chamber.

2. In an engine of the character described, a housing, a plurality of non-circular rotors mounted therein for simultaneous rotation all in the same direction about parallel axes, and contacting each other throughout their entire cycle of rotation whereby they and opposed walls of said housing cooperate to define a chamber whose volume varies as said rotors turn, the periphery of each of said rotors being defined by an arc of substantially 90° at each end thereof having its center on the major axis of the rotor, and an arc of substantially 90° defining each side of the rotor and connecting said end arcs, each side arc having its center on the line of the minor axis of the rotor beyond the axis of rotation thereof from said side arc, and means for conducting fluid to and from said chamber.

3. In an engine of the character described, a housing comprising a pair of spaced side walls and a peripheral wall, a plurality of non-circular rotors revolubly mounted therein for simultaneous rotation all in the same direction and contacting each other throughout their entire cycle of rotation whereby they and said side walls cooperate to define an inner chamber, the inner surface of said peripheral wall substantially conforming to and being spaced only slightly from the loci of the points on said rotors at the greatest radial distances from their respective axes of rotation, whereby said peripheral wall cooperates with said rotors and side walls to define an outer chamber, the respective volumes of said chambers varying as said rotors turn, the periphery of each of said rotors being defined by an arc at each end thereof having its center on the major axis of the rotor, and an arc defining each side of the rotor and connecting said end arcs, each side arc having its center on the line of the minor axis of the rotor beyond the axis of rotation thereof from said side arc, and means for conducting fluid to and from each of said chambers.

4. In an engine of the character described, a housing comprising a pair of spaced side walls and a peripheral wall, a plurality of non-circular rotors revolubly mounted therein for simultaneous rotation all in the same direction and contacting each other throughout their entire cycle of rotation whereby they and said side walls cooperate to define an inner chamber, the inner surface of said peripheral wall substantially conforming to and being spaced only slightly from the loci of the points on said rotors at the greatest radial distances from their respective axes of rotation, whereby said peripheral wall cooperates with said rotors and side walls to define an outer chamber, the respective volumes of said chambers varying as said rotors turn, the periphery of each of said rotors being defined by an arc of substantially 90° at each end thereof having its center on the major axis of the rotor, and an arc of substantially 90° defining each side of the rotor and connecting said end arcs, each side arc having its center on the line of the minor axis of the rotor beyond the axis of rotation thereof from said side arc, and means for conducting fluid to and from each of said chambers.

5. In an engine of the character described, a housing comprising a pair of spaced side walls, a plurality of non-circular rotors revolubly mounted therebetween and cooperating with each other and with said walls to define a closed chamber whose volume varies as said rotors turn, at least one of said side walls having a port therein covered by one of said rotors, said rotor having a channel therein in position to communicate with said port during a predetermined period in the cycle of rotation of said rotor, and the inner face of said wall having a channel therein one end of which is in position to communicate with said rotor channel and the other end of which is in position to communicate with said chamber during at least a portion of said period, communication between said wall channel and said chamber being established only when a portion of said rotor other than one having the greatest radius is disposed toward said other end of said wall channel, and a conduit communicating with said port.

6. In an engine of the character described, a housing comprising a pair of spaced side walls, a plurality of non-circular rotors revolubly mounted therebetween and cooperating with each other and with said walls to define a closed chamber whose volume varies as said rotors turn, one of said side walls having an intake port therein and one of said side walls having an exhaust port therein, certain of said rotors covering said ports at all times but having channels therein in position to register with said ports during predetermined periods in the cycle of rotation of said rotors, and the inner faces of said walls having intake and exhaust channels therein in position to establish communication between said chamber and said rotor channels during predetermined periods in the cycle of rotation of said rotor, and conduits communicating with said ports.

7. In an engine of the character described, a housing comprising a pair of spaced side walls, a plurality of non-circular rotors revolubly mounted therebetween and cooperating with each other and with said walls to define a closed chamber whose volume varies as said rotors turn, one of said side walls having an intake port therein and one of said side walls having an exhaust port therein, certain of said rotors covering said ports but having channels therein in position to register with said ports during predetermined periods in the cycle of rotation of said rotors, and the inner faces of said walls having intake and exhaust channels therein in position to establish communication between said chamber and said rotor channels during predetermined periods in the cycle of rotation of said rotor, communication between said chamber and said wall channels being interrupted by complete covering of said wall channels by the associated rotors.

8. In an engine of the character described, a housing, a plurality of non-circular rotors revolubly mounted therein and cooperating therewith and with each other to define a plurality of closed chambers, the respective volumes of which vary as said rotors turn, and means for charging and exhausting each of said chambers comprising ports in a wall of said housing at all times covered by certain of said rotors, each of said port-covering rotors having a channel in that face thereof which engages said wall, said channel being in position to communicate with the associated port during a predetermined period in the cycle of rotation of said rotor, and the inner face of said wall having channels therein, one end of each of which is in position to communicate with the associated rotor channel during said period and the other end of each of which is in position to be uncovered by a portion of the associated rotor other than at its greatest radius and thus communicate with the associated chamber.

9. In an engine of the character described, a housing, a plurality of non-circular rotors revolubly mounted therein and cooperating therewith and with each other to define an inner chamber surrounded by said rotors and an outer chamber surrounding said rotors, the respective volumes of which vary as said rotors turn, and means for charging and exhausting each of said chambers comprising ports in a wall of said housing at all times covered by certain of said rotors, each of said port-covering rotors having a channel in that face thereof which engages said wall, said channel being in position to communicate with the associated port during a predetermined period in the cycle of rotation of said rotor, and the inner face of said wall having channels therein, one end of each of which is in position to communicate with the associated rotor channel during said period and the other end of each of which is in position to be uncovered by a portion of the associated rotor other than at its greatest radius and thus communicate with the associated chamber.

MILTON S. HOPKINS.